Figure 1:
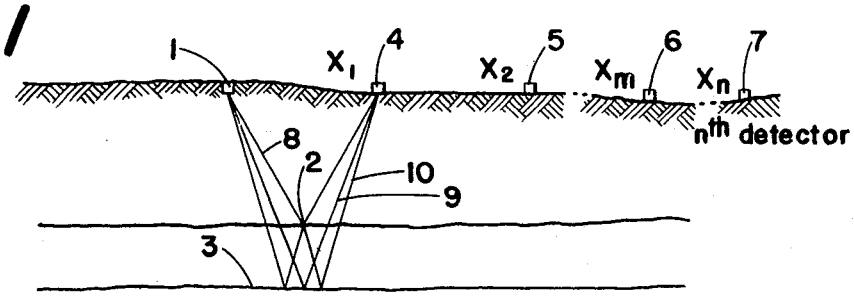

Dec. 22, 1970     M. R. FOSTER ET AL     3,550,073
OPTIMUM SEISMIC VELOCITY FILTERS
Filed March 12, 1965     7 Sheets-Sheet 1

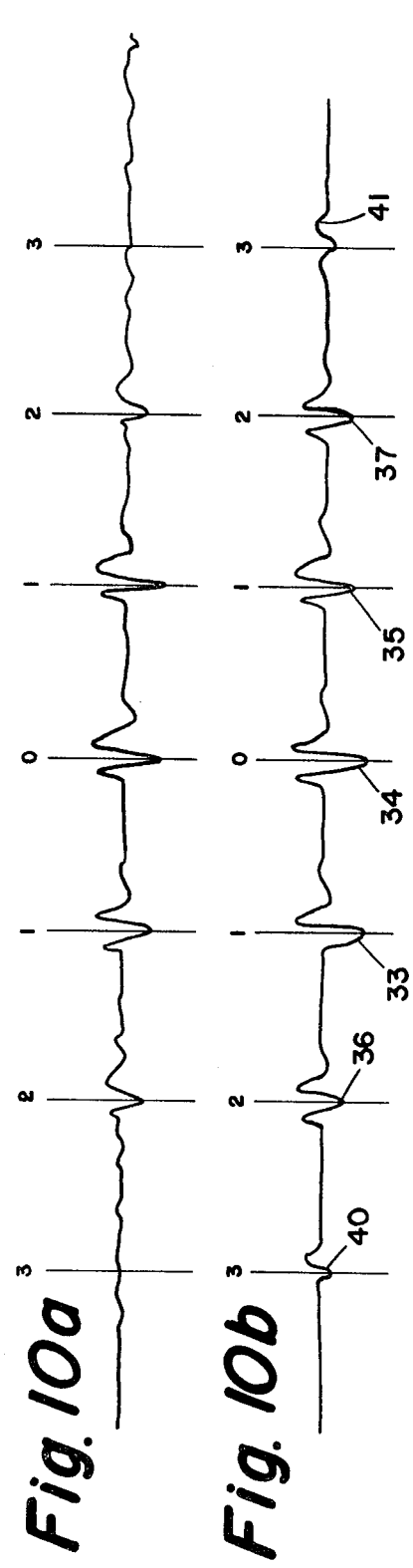
Fig. 10a  Fig. 10b  Fig. 16

Amplitude Response at $f = 35\,\text{cps}, R_N = 9, R_U = 1, \gamma = 4$

High Velocity Reject Filter
Amplitude Response at $f = 35\,\text{cps}, R_N = 1.9, R_U = .1\ \gamma = 5.$

3,550,073
OPTIMUM SEISMIC VELOCITY FILTERS
Manus R. Foster, Irving, and Raymond L. Sengbush, Grand Prairie, Tex., and Robert J. Watson, State College, Pa., assignors to Mobil Oil Corporation, a corporation of New York
Filed Mar. 12, 1965, Ser. No. 439,160
Int. Cl. G01v 1/28
U.S. Cl. 340—15.5    4 Claims This invention relates to the processing of seismic data and, more particularly, to optimum filtering techniques for removing coherent noise events having a particular range of velocities from seismic data.

In seismic exploration, it has become common to process the seismic data obtained as a result of a seismic disturbance to remove some of the noise thereby rendering the seismic data easier to interpret.

This noise which is present in the seismic data may include random, or incoherent, noise which is present by reason of the instruments used or the particular obscuring nature of the geophysical formations being surveyed.

There is another type of noise which is referred to as coherent noise. This noise includes what is commonly referred to as ghosts or multiple reflections from the reflecting interfaces. It is possible to suppress these types of coherent noise with certain processing techniques. The usual practice is to obtain a plurality of seismic traces from detectors spaced at varying distances from a source of seismic energy. With the detectors spaced in this manner, the coherent noise events (multiple or ghost reflections) on the different seismic traces have different moveout times. This difference in moveout time of events on an array of seismic traces is the fundamental property which is operated upon in multitrace processing. Filters are designed to accept certain apparent velocities, or a range of velocities, and reject others in an optimum manner in accordance with specified design criteria. Such filters are referred to as moveout, or velocity, filters as distinguished from the more familiar electrical filters which discriminate between signal and noise on the basis of differences in frequency spectrum. Moveout filters discriminate between signal and noise on the basis of difference in the moveout, or apparent velocity, of coherent events across an array of seismic traces. As an example of movement filtering techniques, reference is made to copending application Ser. No. 344,699, filed Dec. 31, 1963, and entitled Method for Processing Seismic Data, now abandoned.

In prior moveout filtering techniques, there have been employed velocity filters which were suboptimum. In accordance with the present invention, these filtering techniques are improved so that the result of the filtering operation closely approximates the optimum.

One disadvantage of prior art suboptimum filters is that when the acceptance region of apparent velocities which will be passed by the filter is made quite narrow, the low frequency response of the filter deteriorates. In many situations it is quite desirable to have both a very narrow range of apparent velocities which will be passed by the filters and also have good low frequency response. In accordance with the present invention it is possible to perform filtering with both of these desirable features present.

In accordance with another aspect of this invention, the velocity filters may be adapted for any desired probability density function of signal moveouts and any desired probability density function of noise moveouts. That is, the seismologist may select, on the basis of past experience, any suitable probability density functions for the probability of the signal and noise moveouts.

In accordance with another important aspect of this invention, it is possible to vary both the upper and lower limits of the coherent noise reject band to provide optimum suppression of coherent noise in the band in which said noise is most likely to occur.

In accordance with another aspect of this invention, it is possible to utilize filters in which the random noise-to-signal power and the coherent noise-to-signal power are functions of frequency.

Figure 2:
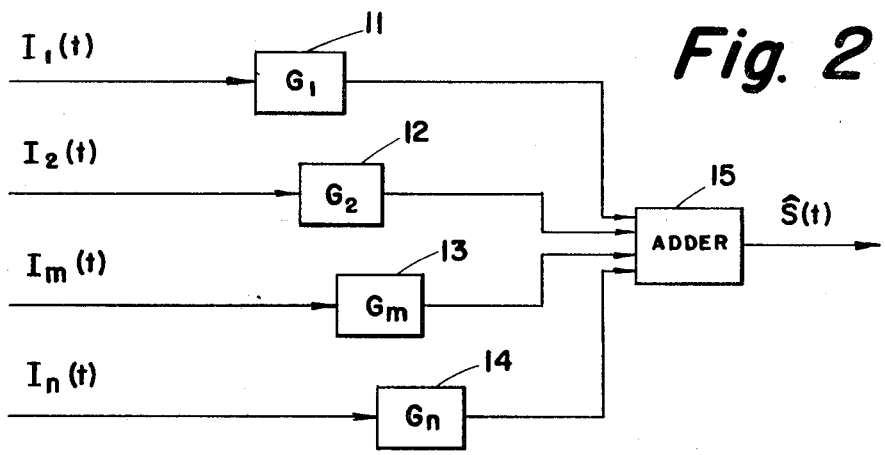
Figure 3:
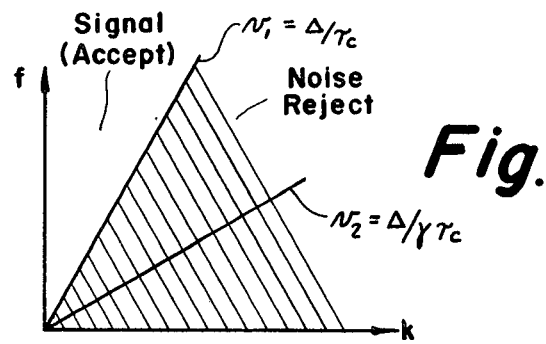
Figure 4:
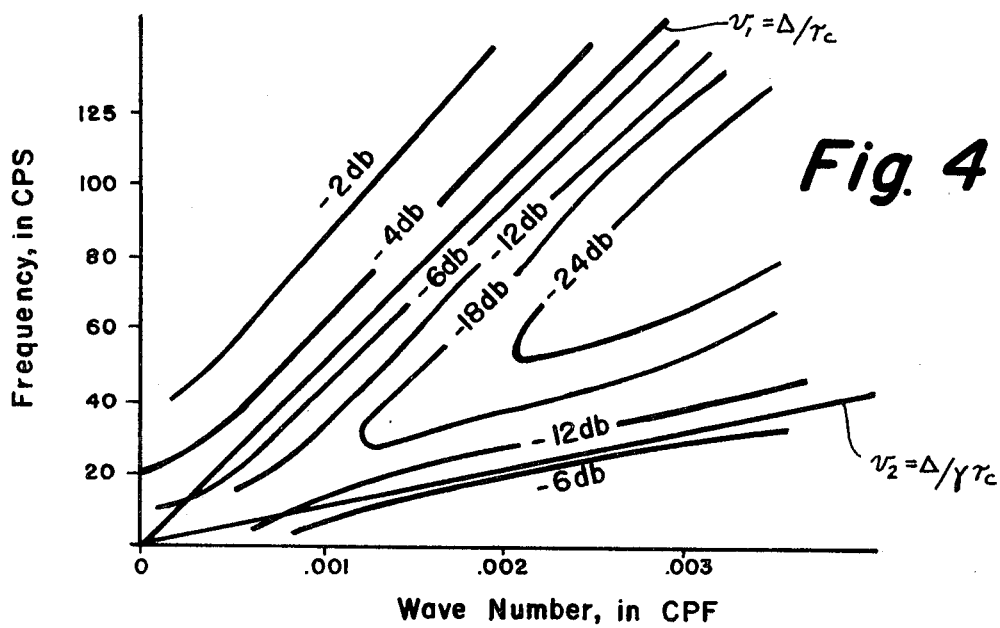
Figure 5:
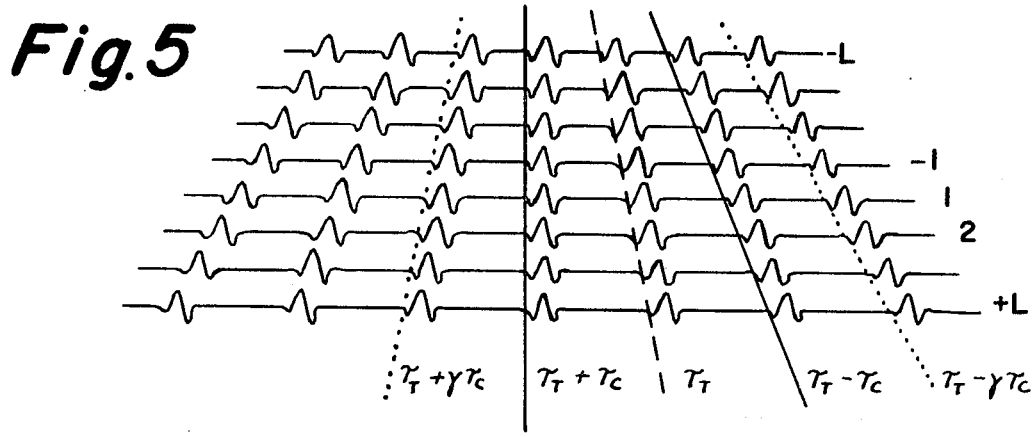
Figure 6:
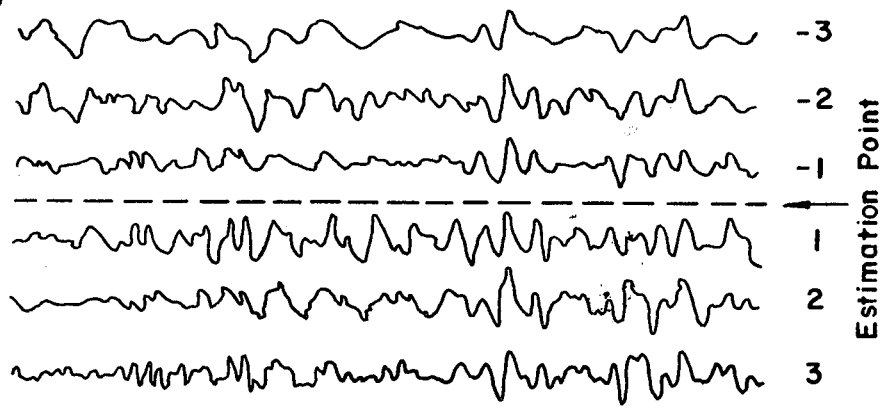
Figure 7:
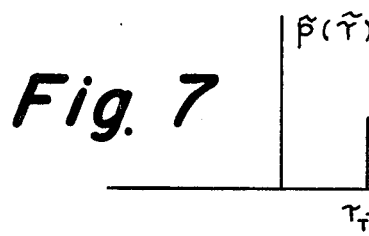
Figure 8:
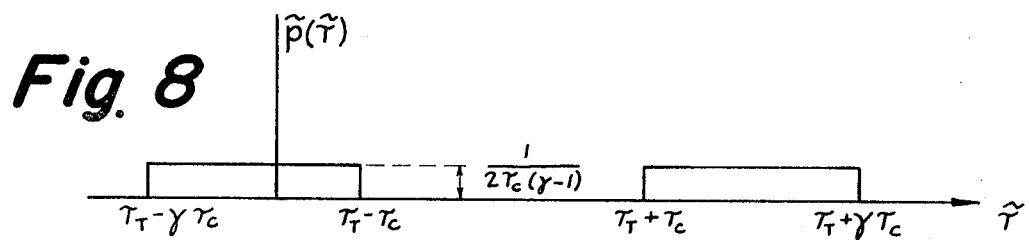
Figure 9:
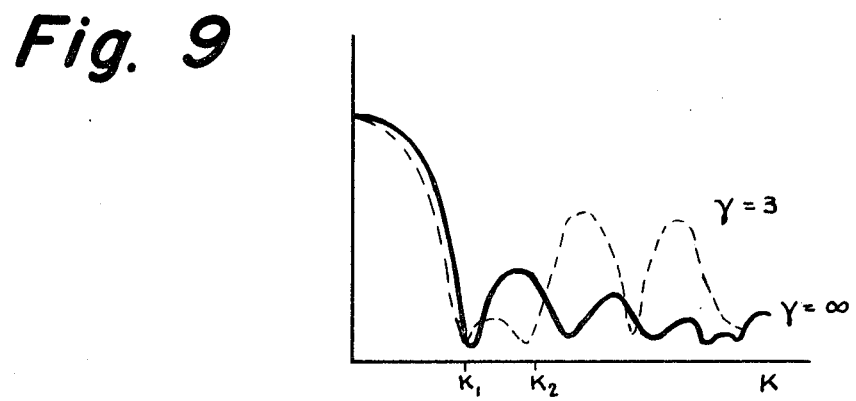
Figure 11A:
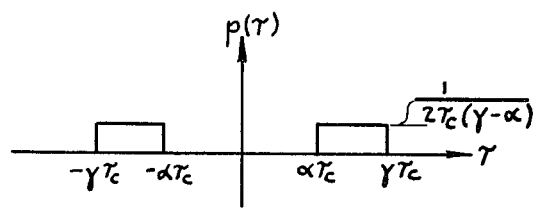
Figure 11B:
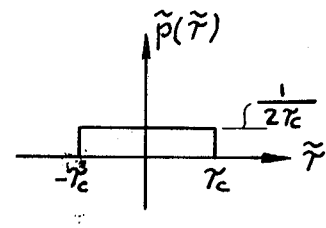
Figure 12:
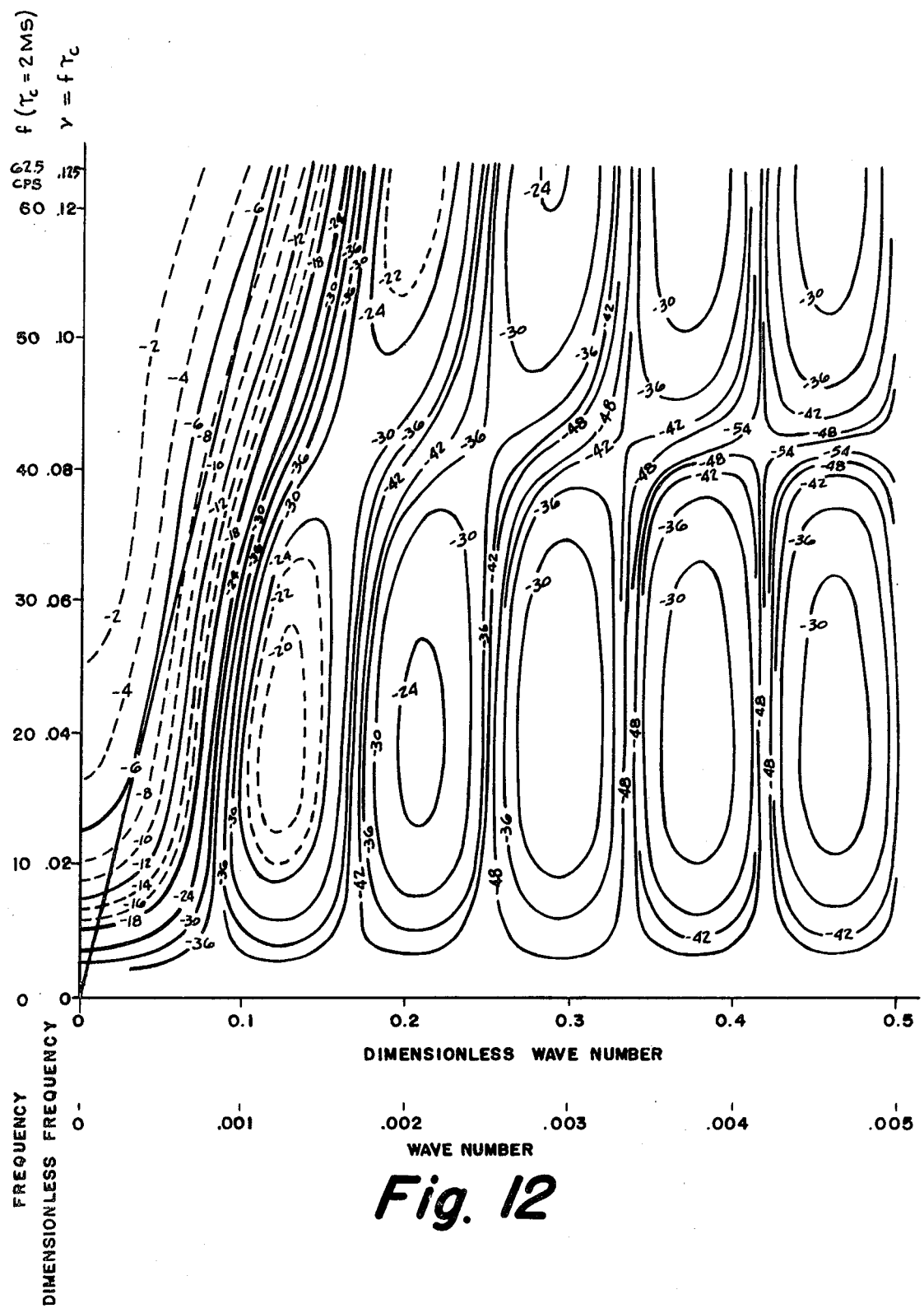
Figure 13:
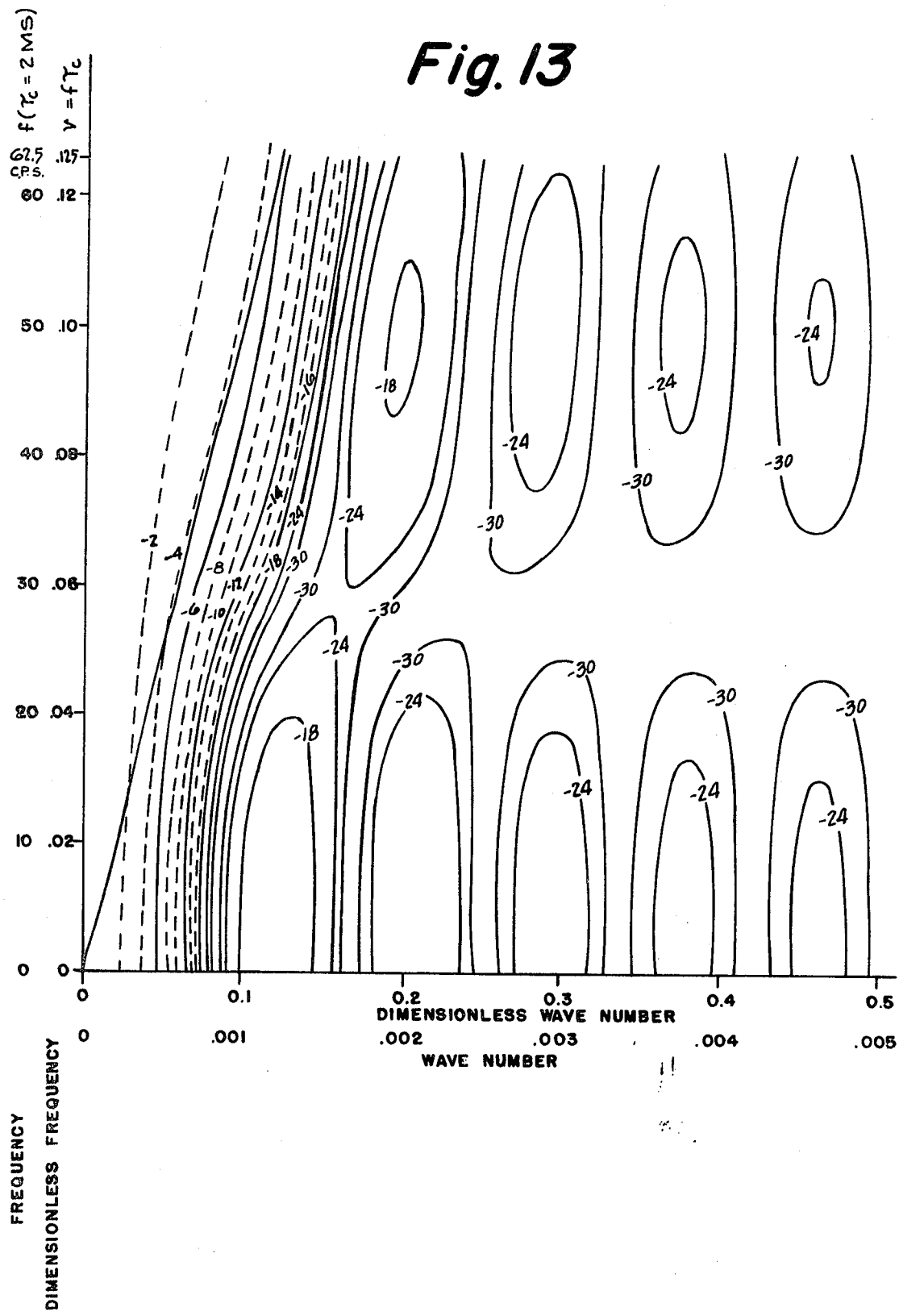
Figure 14:
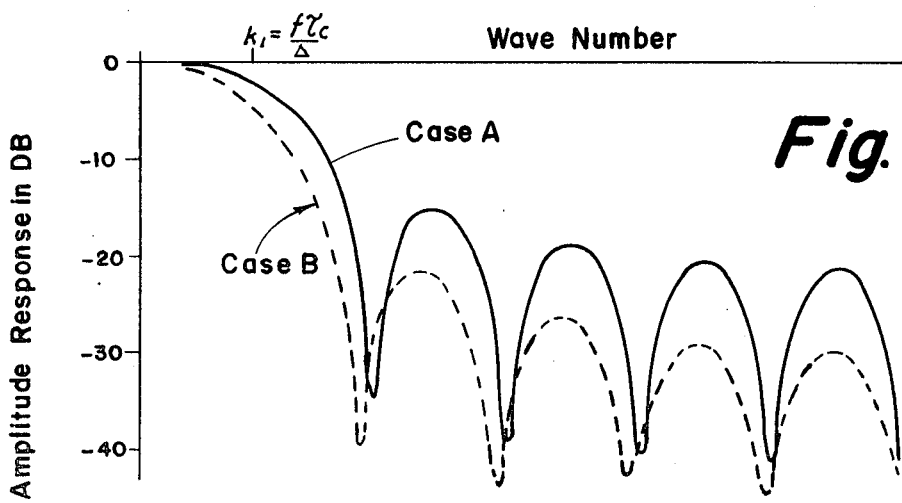
Figure 15:
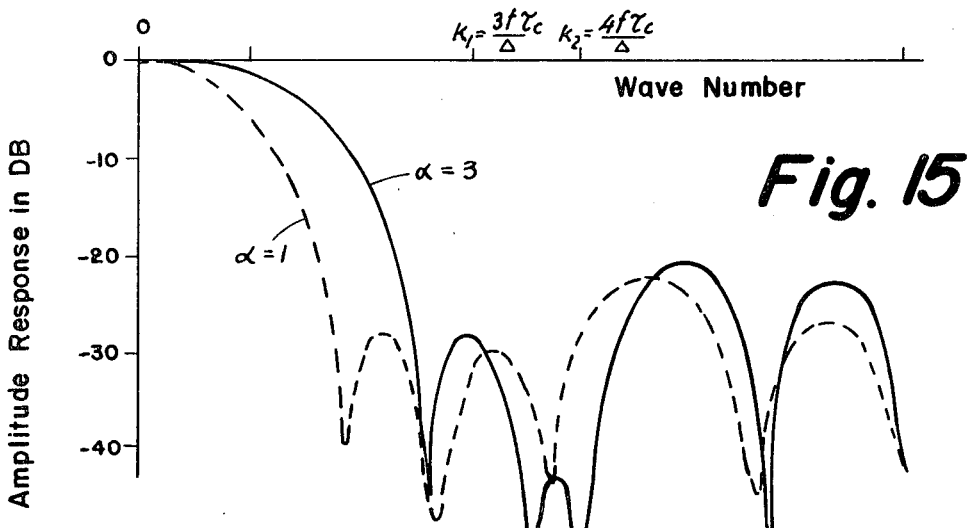
Figure 17:
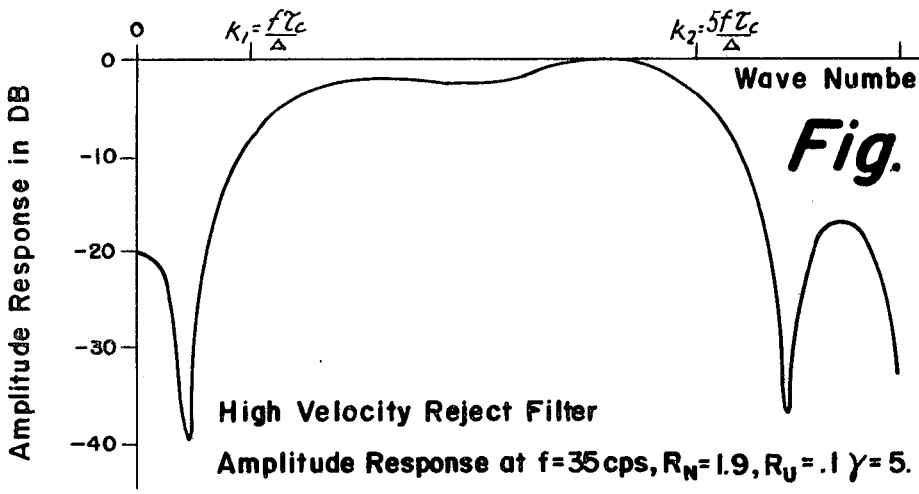

The foregoing and other objects, features and advantages of the present invention will be better understood from the following more detailed descrpition and appended claims in conjunction with the drawings in which:

FIG. 1 shows a field system for obtaining multiple traces;
FIG. 2 shows a velocity filtering system for the multiple traces;
FIG. 3 shows an $f-k$ plot;
FIG. 4 shows another $f-k$ plot;
FIG. 5 shows an array of seismic traces;
FIG. 6 shows an array of seismic traces;
FIG. 7 shows the probability density function for the signals for a high velocity pass type of filter;
FIG. 8 shows the probability density function for noise for the high velocity pass type filter;
FIG. 9 is an $f-k$ plot showing the effect of varying $\gamma$;
FIGS. 10$a$ and 10$b$ are traces showing the effect of varying $\gamma$;
FIG. 11$a$ shows the probability density function for the signal for a high velocity reject type of filter;
FIG. 11$b$ shows the probability density function of noise for a high velocity reject type of filter;
FIG. 12 shows an $f-k$ plot for "doublet" filter;
FIG. 13 shows an $f-k$ plot for an optimum filter;
FIG. 14 is an $f-k$ plot showing the effect of varying $R_N$ as a function of frequency;
FIG. 15 shows the effect of varying $\alpha$ on the amplitude response of a filter;
FIG. 16 shows the time domain response of the reject processor; and
FIG. 17 shows the amplitude response of a high velocity reject filter.

MULTITRACE VELOCITY FILTERING, FIGS. 1 AND 2

As an example of the type of processing to which this invention is directed, consider the field system of FIG. 1 wherein a shot of dynamite 1 is exploded to produce seismic energy which is reflected from subsurface interfaces 2 and 3 and detected at the plurality of detectors 4, 5, 6 and 7. Although only four detectors have been shown, it will be appreciated that any suitable number of detectors may be employed. To indicate this, detector 7 is referred to as the $n$th detector. That is, any number of detectors from 1 to $n$ may be employed. Detector 6 has been denoted the $m$th detector. Hereinafter, $m$ will be used to denote generally any particular detector or the trace obtained from that detector.

Each of the detectors produces a signal which is recorded. The result is that there is produced $n$ seismic traces each representing seismic energy from the shot 1 reflected from subsurface interfaces 2 and 3.

Seismic energy from the shot 1 will be reflected directly from the subsurface reflecting interfaces as indicated by the ray paths 8 and 9, which respectively depict the travel of seismic energy from the shot 1 to the reflecting interfaces 2 and 3 and back to the detector 4. The resultant indication on the trace produced by detector 4 is referred to as a primary reflection. These primary reflections are quite useful to the seismologists in determining the position and nature of the subsurface interfaces producing the reflections. Unfortunately, these primary reflections are often totally obscured by ghost and multiple reflections. One possible ray path which will produce such a multiple reflection is indicated at 10. It will be appreciated that there are a large number of possible ray paths that will product these multiple reflections and the resultant large amount of coherent noise on each of the traces often obliterates the primary information which is useful for interpretation.

When all of the traces produced by the detection of seismic energy at each of the detectors 4, 5, 6 and 7 have been obtained, these traces may be transported to a central processing center where the processing is performed to suppress the multiple and ghost reflections. The processing which is referred to as moveout or velocity filtering is shown in FIG. 2.

The seismic traces obtained from the detectors 4, 5, 6 and 7 are converted to electrical signals and each is applied to one of the filters 11, 12, 13 or 14. The individual seismic traces are denoted $I_1(t)$, $I_2(t)$, ... $I_m(t)$, ... $I_n(t)$. The filters 11–14 are designed so as to best recover a seismic signal corrupted by both coherent and incoherent noise. The outputs of the filters are summed in an adder 15 to produce the desired signal estimate $S(t)$.

The fundamental property upon which such a set of filters is designed is the differing moveout times from trace-to-trace between primary reflection events and multiple, ghost, or other coherent noise events. In many cases, these coherent noise events can be followed from trace-to-trace on a seismic record but, frequently due to superposition of many events, this cannot be done.

As an example of the differing moveout times between a primary event and a secondary event, consider multiple reflections. Multiple reflections arriving at a given time on the seismic trace of record do not have the same normal moveout as primary reflections arriving at the same time. This is due to the fact that the average velocity of the earth changes with depth, usually increasing. Because the multiple reflection travels further at a shallower depth than the primary reflection, the average velocity in the multiple path is different than the average velocity in the primary path. In additionu, if the geologic section has dip, the multiple moveout due to dip will be different than the primary moveout due to dip. If the dip' is constant with depth, the multiple moveout will be about twice the primary moveout.

BACKGROUND THEORY, $f$–$k$ PLOTS, FIGS. 3 AND 4

Before proceeding with a description of the optimum filters which are provided in accordance with this invention, there must first be described some background theory which will be useful in obtaining a good understanding of this invention. First, there will be described $f$–$k$ plots as a means for depicting the effectiveness of a velocity filter processor.

A plane wave with frequency $f$ travelling with velocity $v$ in the $x$ direction can be represented by:

(1) $$I(t,x) = e^{i2\pi f(t-x/v)}$$

By substituting $k = f/v$, we obtain:

(2) $$I(t,x) = e^{i2\pi(ft-kx)}$$

The parameter $k$ is reciprocal wave length, or wave number.

Consider now that the travelling sinusoid is the input to the $n$ trace processor, as shown in FIG. 2. The $m$th input, from a trace located at distance $x_m$, is filtered by $G_m$. The outputs from each $G_m$ filter are summed to produce $\hat{S}(t)$.

The Fourier transform of the output of each of the $G_m$ filters is the product of the Fourier transform of the input and the transfer function of the filter.

(3) $$O_m(f,k) = F[I_m(t)] \cdot G_m(f)$$

The Fourier transform of the input is:

(4) $$F[I_m(t)] = \int_{-\infty}^{+\infty} e^{i2\pi f(t-kx_m)} e^{-i2\pi ft} dt = e^{-i2\pi kx_m}$$

The Fourier transform of the output of the $n$ trace processor is given by the following summation:

(5) $$\psi(f,k) = \sum_{m=1}^{n} G_m(f) e^{-i2\pi kx_m}$$

The Fourier transform of the output, $\psi(f,k)$, is the transfer function of the $n$ trace processor. The processor is a two-dimensional filter having a response that depends upon both frequency and wave number. Its amplitude response is the absolute magnitude of $\psi(f,k)$.

(6) $$|\psi(f,k)| = \left| \sum_{m=1}^{n} G_m(f) e^{-i2\pi kx_m} \right|$$

Its phase response is given by:

(7) $$\text{Arg } \psi(f,k) = \tan^{-1} \frac{Im\psi(f,k)}{Re\psi(f,k)}$$

where:

$Im$ is the imaginary part of $\psi(f,k)$, and
$Re$ is the real part of $\psi$.

The amplitude response plotted as a function of the independent variables $f$ and $k$ is called the $f$–$k$ plot. We plot $f$ as the ordinate and $k$ as the abscissa, and contour the amplitude response in db. The contour plot shows the relationship between the input and output of the processor when the input is a plane wave. A plane wave sinusoid is a point in $f$–$k$ space, and the amplitude response at this point indicates the relative rejection of this input. A plane wave impulse travelling with constant apparent velocity $v_a$ is a straight line through the origin in $f$–$k$ space. The slope of the line is $1/v_a$. The impulse has unit amplitude at all $f$–$k$ points along this line; therefore, the amplitude response along this line indicates the relative rejection of this input. In general, the impulse response of the system depends upon the apparent velocity of the impulse.

The $n$ trace processor discriminates between signal and noise on the basis of differences in apparent velocity. Suppose the apparent velocity of the signal falls in the range $v_a > v_1$, and the noise falls in the range $v_2 < v_a < v_1$, as shown by FIG. 3. An effective processor should pass all events in the signal region and reject all events in the noise region.

We will only consider equally spaced input traces, with spacing equal to $\Delta$ ft. Then, a constant apparent velocity corresponds to a constant moveout per trace, $\tau = \Delta/v_a$. We define $\tau_c = \Delta/v_1$, and $\gamma\tau_c = \Delta/v_2$. The accept region is defined by the moveout range $0 < \tau < \tau_c$, and the reject region by $\tau_c < \tau < \gamma\tau_c$. When $\gamma \to \infty$, the line $v_2$ corresponds to zero apparent velocity.

A typical $f$–$k$ plot for $\tau_c = 2$ ms./trace, $\Delta = 100$ ft., and $\gamma = 5$ is shown in FIG. 4. In this example, the accept region is flat within 2 db over the range of frequencies encountered in seismic prospecting. In the reject region, these same frequencies are reduced by as much as 24 db. In other words, the events with moveout velocities in the range between $v_1$ and $v_2$ are attenuated and the events with moveout velocities greater than $v_1$ are passed with negligible attenuation. The response in the region where the moveout velocities are less than $v_2$ has not been included in the design criterion. In general, this region has less attenuation than the region between $v_1$ and $v_2$.

OPTIMUM FILTERS PROVIDED IN ACCORDANCE WITH THIS INVENTION, FIGS. 5 AND 6

Now consider an input signal which is additively composed of signal and coherent noise, with moveouts per trace of $\tau$ and $\bar{\tau}$, respectively, plus random noise. The signal and coherent noise shapes do not change from trace-to-trace. The traces must be corrected for normal moveout, because it is non-linear, before they can be processed. FIG. 5 shows a set of traces which have been corrected for normal moveout in a well-known manner. A sequence of traces is shown with events running across the array with various moveouts, all linear, i.e., a given event falls on a straight line as it is followed from trace to trace.

The signal is defined as the events that have moveout per trace falling in the range $\tau_T - \tau_c$ to $\tau_T + \tau_c$, and the noise, by the events that fell outside that range. $\tau_T$ is called the tilt axis. It corresponds to the most probable dip of the signal. In FIG. 5, the dashed line is the tilt axis and the heavy lines having moveouts $\tau_T - \tau_c$ and $\tau_T + \tau_c$, respectively, are the moveout boundaries of the signal. Coherent noise has moveouts lying between $\tau_T - \tau_c$ and $\tau_T - \gamma\tau_c$, and also between $\tau_T + \tau_c$ and $\tau_T + \gamma\tau_c$, where $\gamma > 1$. In FIG. 5, the zones between the solid lines (signal boundaries) and the dotted lines are the ranges of noise moveouts.

In the $n$ trace processor, we will assume that the total number of traces is even. FIG. 6 shows six such traces, labeled $j = -3, \ldots, j = +3$. The output trace estimate may be located at an actual trace or at an intermediate point. In FIG. 6, the output trace estimate is located half-way between traces $+1$ and $-1$. This is called a center trace estimate. Then, a signal component on the $m$th trace has a delay relative to a fictitious trace half-way between the $-1$ and $+1$ trace, given by:

(8)
$$\tau_m = a_m \frac{\Delta}{v_a}$$

where (9)
$$a_m = \begin{cases} m - 1/2 \text{ for } m \geq 1 \\ m + 1/2 \text{ for } m \leq 2 \end{cases}$$

$\Delta$ is the spacing between detectors, and
$v_a$ is the apparent velocity of seismic energy.

In the above, $a_m$ is a number equal to the distance from the estimation point to the detector producing the $m$th trace, divided by the spacing between the successive detectors. Stated another way, $a_m \Delta$ is the distance from the estimation point to the detector producing the $m$th trace.

Now, we will assume that the moveouts $\tau$ and $\tilde{\tau}$ for the signal and coherent noise, respectively, are random variables with probability densities $p(\tau)$ and $\tilde{p}(\tilde{\tau})$, respectively.

There can now be described the filters 11, 12, 13 and 14 of FIG. 2 which are provided in accordance with this invention. In order to provide optimum filters, the filters are each given an amplitude spectrum determined by the following:

(10)
$$\sum_{j=-n/2}^{n/2} G_j(\omega) \left[ \int_{-\infty}^{+\infty} e^{-i\omega(a_j\tau - a_m\tau)} p(\tau) d\tau \right.$$
$$+ R_N(\omega) \int_{-\infty}^{+\infty} e^{-i\omega(a_j\tilde{\tau} - a_m\tilde{\tau})} \tilde{p}(\tilde{\tau}) d\tilde{\tau}$$
$$\left. + \delta_{mj} R_U(\omega) \right] = \int_{-\infty}^{+\infty} e^{i\omega a_m\tau} p(\tau) d\tau$$
$$m = -n/2, \ldots n/2$$

where:

$$m = -n/2, \ldots n/2$$

where:

$i$ represents $\sqrt{-1}$,
$n$ is the total number of traces,
$j$ represents successive integers between $-n/2$ and $n/2$, not including zero,
$m$ represents successive integers between $-n/2$ and $n/2$, not including zero,
$\omega$ is the frequency of the seismic disturbance,
$\tau$ represents primary reflection moveout per trace,
$\tilde{\tau}$ is the coherent noise moveout per trace,
$a_j$ is a number equal to the distance from the estimation point to the detector producing the $j$th trace divided by the spacing between the successive detectors,
$a_m$ is a number equal to the distance from the estimation point to the detector producing the $m$th trace divided by the spacing between the successive detectors,
$\delta_{mj}$ is equal to 1 when $m = j$; it is 0 at other times,
$R_U(\omega)$ is the random noise-to-signal power ratio,
$R_N(\omega)$ is the coherent noise-to-signal power ratio,
$p(\tau)$ is the probability density function of the primary reflection moveout, and
$\tilde{p}(\tilde{\tau})$ is the probability density function of the coherent noise moveout.
$e$ is the base of the system of Napierian logarithms.

In the foregoing, $\delta_{mj}$ is equal to 1 when $m$ is equal to $j$, and it is zero at all other times. Equation 10 describes a set of simultaneous equations which can be solved for the amplitude spectrums $G_1, G_2, G_3, \ldots G_n$ of each of the filters. Equation 10 can be written in a more convenient notation by defining each of the integrals in the equation as the ensemble average. This definition of the integrals as an ensemble average is a well-known mathematical notation. As an example of this definition, consider the first integral in Equation 10. The ensemble average of this integrand is given below:

(11)
$$\int_{-\infty}^{+\infty} e^{-i\omega(a_j\tau - a_m\tau)} p(\tau) d\tau = \langle e^{-i\omega(a_j\tau - a_m\tau)} \rangle$$

As another simplification, hereinafter let $a_j\tau = \tau_j$, and $a_m\tau = \tau_m$.

Using this definition, Equation 10 becomes:

(12)
$$\sum_{j=-n/2}^{n/2} G_j(\omega) [\langle e^{-i\omega(\tau_j - \tau_m)} \rangle + R_N(\omega) \langle e^{-i\omega(\tilde{\tau}_j - \tilde{\tau}_m)} \rangle$$
$$+ \delta_{mj} R_U(\omega)] = \langle e^{i\omega\tau_m} \rangle$$
$$m = -n/2 \ldots n/2$$

When equation 12 is expanded, there is produced a set of simultaneous equations, the number of equations being equal to the number of filters, that is, equal in number to $n$. For each value of $m$ between $-n/2$ and $n/2$, there will be produced an equation. As an example, consider the very simple case of a four filter processor, $n = 4$. Expanding Equation 12 into a set of simultaneous equations there is obtained:

for $m = -2$:

(13)
$$G_{-2}[\langle e^{-i\omega(\tau_{-2} - \tau_{-2})} \rangle + R_N(\omega) \langle e^{-i\omega(\tilde{\tau}_{-2} - \tilde{\tau}_{-2})} \rangle + R_U(\omega)]$$
$$+ G_{-1}[\langle e^{-i\omega(\tau_{-1} - \tau_{-2})} \rangle + R_N(\omega) \langle e^{-i\omega(\tilde{\tau}_{-1} - \tilde{\tau}_{-2})} \rangle + 0]$$
$$+ G_1[\langle e^{-i\omega(\tau_1 - \tau_{-2})} \rangle + R_N(\omega) \langle e^{-i\omega(\tilde{\tau}_1 - \tilde{\tau}_{-2})} \rangle + 0]$$
$$+ G_2[\langle e^{-i\omega(\tau_2 - \tau_{-2})} \rangle + R_N(\omega) \langle e^{-i\omega(\tilde{\tau}_2 - \tilde{\tau}_{-2})} \rangle + 0]$$
$$= \langle e^{i\omega\tau_{-2}} \rangle$$

for $m = -1$:

(14)
$$G_{-2}[\langle e^{-i\omega(\tau_{-2} - \tau_{-1})} \rangle + R_N(\omega) \langle e^{-i\omega(\tilde{\tau}_{-2} - \tilde{\tau}_{-1})} \rangle + 0]$$
$$+ G_{-1}[\langle e^{-i\omega(\tau_{-1} - \tau_{-1})} \rangle + R_N(\omega) \langle e^{-i\omega(\tilde{\tau}_{-1} - \tilde{\tau}_{-1})} \rangle + R_U(\omega)]$$
$$+ G_1[\langle e^{-i\omega(\tau_1 - \tau_{-1})} \rangle + R_N(\omega) \langle e^{-i\omega(\tilde{\tau}_1 - \tilde{\tau}_{-1})} \rangle + 0]$$
$$+ G_2[\langle e^{-i\omega(\tau_2 - \tau_{-1})} \rangle + R_N(\omega) \langle e^{-i\omega(\tilde{\tau}_2 - \tilde{\tau}_{-1})} \rangle + 0]$$
$$= \langle e^{i\omega\tau_{-1}} \rangle$$

for $m=1$:

(15)
$$G_{-2}[<e^{-i\omega(\tau-2-\tau_1)}>+R_N(\omega)<e^{-i\omega(\tilde{\tau}-2-\tilde{\tau}_1)}>+0]$$
$$+G_{-1}[<e^{-i\omega(\tau-1-\tau_1)}>+R_N(\omega)<e^{-i\omega(\tilde{\tau}-1-\tilde{\tau}_1)}>+0]$$
$$+G_1[<e^{-i\omega(\tau_1-\tau_1)}>R_N(\omega)<e^{-i\omega(\tilde{\tau}_1-\tilde{\tau}_1)}>+R_U(\omega)]$$
$$+G_2[<e^{-i\omega(\tau_2-\tau_1)}>+R_N(\omega)<e^{-i\omega(\tilde{\tau}_2-\tilde{\tau}_1)}>+0]$$
$$=<e^{i\omega\tau_1}>$$

for $m=2$:

(15a)
$$G_{-2}[<e^{-i\omega(\tau-2-\tau_2)}>+R_N(\omega)<e^{-i\omega(\tilde{\tau}-2-\tilde{\tau}_2)}>+0]$$
$$+G_{-1}[<e^{-i\omega(\tau-1-\tau_2)}>+R_N(\omega)<e^{-i\omega(\tilde{\tau}-1-\tilde{\tau}_2)}>+0]$$
$$+G_1[<e^{-i\omega(\tau_1-\tau_2)}>+R_N(\omega)<e^{i\omega(\tilde{\tau}_1-\tilde{\tau}_2)}>+0]$$
$$+G_2[<e^{-i\omega(\tau_2-\tau_2)}>+R_N(\omega)<e^{-i\omega(\tilde{\tau}_2-\tilde{\tau}_2)}>+R_U(\omega)]$$
$$=<e^{i\omega\tau_2}>$$

Thus, there have been produced four equations having four unknown, $G_{-2}$, $G_{-1}$, $G_1$ and $G_2$. These equations can be solved for the four unknown amplitude spectrums $G_{-2}$, $G_{-1}$, $G_1$, and $G_2$. These simultaneous equations can be solved by any well-known technique but, preferably, will be solved by a digital computer as will be subsequently described.

VARYING $R_N$ AND $R_U$ WITH FREQUENCY

There can now be appreciated another advantage of utilizing the techniques of this invention to provide optimum filters, which advantage is not present when prior art suboptimum filters were provided. In prior art velocity filtering systems, the signal-to-noise powers for coherent and random noise, $R_N$ and $R_U$, have always been assumed to be constant with frequency. However, it will be appreciated that in the solution of Equation 12, $R_N$ and $R_U$ can be made to vary with frequency. By making $R_N$ and $R_U$ functions of frequency, there is provided a technique for concentrating the suppression in that portion of $f$–$k$ space in which $R_N$ and $R_U$ are high, and accentuating that portion where $R_N$ and $R_U$ are low. The manner of varying $R_N$ and $R_U$ with frequency will be more apparent from the subsequent detailed description of a digital computer program which can solve Equation 11. By allowing certain parameters of this program to vary in a desired manner, this dependence of $R_N$ and $R_U$ on frequency can be obtained.

ADAPTABILITY OF OPTIMUM FILTERS TO DIFFERENT ASSUMED PROBABILITY DENSITY FUNCTIONS, A HIGH VELOCITY PASS TYPE FILTER, FIGS. 7 AND 8

Another important advantage of velocity filter processors utilizing filters designed in accordance with Equation 10 is that the filters may be adapted for any desired probability density function of moveouts. That is, the seismologist may select, on the basis of past experience, any suitable probability density functions for the probability of the signal movement $\tau$ and the noise moveouts $\tilde{\tau}$ lying in a particular range. As one example, consider the situation in which the seismologist considers the probability of the signal moveout $\tau$ to be uniformly distributed within a particular range and the probability of the noise moveout $\tilde{\tau}$ to be evenly distributed within a particular range. That is, it is assumed that $\tau$ is a random variable that falls in a band between the limits $\tau_T-\tau_c$ and $\tau_T+\tau_c$, where $\tau_T$ is the midpoint of the band and $2\tau_c$ is the bandwidth. If $\tau$ is uniformly distributed in this band, the appropriate probability density function is:

(16) $$p(\tau)=\frac{1}{2\tau_c}(\tau+\tau_c-\tau_T)u(\tau_c+\tau_T-\tau)$$

where: $u(\tau)$ is a unit step function.

Coherent noise moveout is assumed to occupy a range outside that of signal moveout. The relative noise moveout of the $m$th trace is:

(17) $$\tilde{\tau}_m=a_m\tilde{\tau}$$

where $\tilde{\tau}$ is the coherent noise moveout per trace, and $a_m$ is as previously defined.

We assume that the random veriable $\tilde{\tau}$ lies outside the signal band within a region defined by $\alpha\tau_c<|\tilde{\tau}-\tau_T|<\gamma\tau_c$ where $\alpha\tau_c$ is the lower limit to the noise moveout band, and $\gamma\tau_c$ is the upper limit.

If the noise moveout is also uniformly distributed within its allowed region, then the probability density function of $\tilde{\tau}$ is:

(18) $$\tilde{p}(\tilde{\tau})=\frac{1}{2\tau_c(\gamma-\alpha)}[u(|\tilde{\tau}-\tau_T|-\alpha\tau_c)u(\gamma\tau-|\tau_T-\tilde{\tau}|)]$$

FIG. 7 illustrates the assumed probability density function for the signal moveout $\tau$, and FIG. 8 illustrates the assumed probability density function for noise moveout $\tilde{\tau}$, with $\alpha=1$.

With the assumed uniform probability density functions described by Equations 16 and 18, Equation 10 will be modified to define filters wherein uniform probability density functions are used as follows. First, the ensemble averages of Equation 10 have the following values when uniform probability density functions are used:

(19) $$<e^{-i\omega(\tau_j-\tau_m)}>=\begin{cases}e^{-i\omega\tau_T(a_j-a_m)}\frac{\sin\omega\tau_c(a_j-a_m)}{\omega\tau_c(a_j-a_m)}, & j\neq m \\ 1, & j=m\end{cases}$$

(20) $$<e^{-i\omega(\tilde{\tau}_j-\tilde{\tau}_m)}>=$$
$$\begin{cases}e^{-i\omega\tau_T(a_j-a_m)}\left[\frac{\sin\omega\gamma\tau_c(a_j-a_m)}{\omega\gamma\tau_c(a_j-a_m)}-\frac{\sin\alpha\omega\tau_c(a_c-a_m)}{\alpha\omega\tau_c(a_j-a_m)}\right]j\neq m \\ 1, j=m\end{cases}$$

(21) $$<e^{i\omega\tau_m}>=e^{+i\omega\tau_T a_m}\frac{\sin\omega\tau_c a_m}{\omega\tau_c a_m}$$

In the ensemble averages of Equations 19 and 20, the ensemble average in both cases is equal to 1 where $j$ is equal to $m$. In all other situations, the ensemble average is given by the functions shown at the top of the brackets.

Substituting these ensemble averages into Equation 12 results in the following equation:

(22) $$\sum_{j=-n/2}^{n/2}G_j(\omega)e^{-i\omega\tau_T a_j}\left[\frac{\sin\omega\tau_c(a_j-a_m)}{\omega\tau_c(a_j-a_m)}\right.$$
$$\left.-\frac{\alpha R_N}{\gamma-\alpha}\frac{\sin\alpha\omega\tau_c(a_j-a_m)}{\alpha\omega\tau_c(a_j-a_m)}+\frac{\gamma R_N}{\gamma-\alpha}\frac{\sin\omega\gamma\tau_c(a_j-a_m)}{\omega\gamma\tau_c(a_j-a_m)}\right.$$
$$\left.+R_U\delta_{mj}\right]=\frac{\sin\omega\tau_c a_m}{\omega\tau_c a_m}$$
$$m=-n/2\ldots n/2$$

This system of equations, when solved, will define the amplitude spectrums for the $n$ filters which are used in the $n$ trace processor.

When $\alpha=1$, Equation 22 can be written in the following form:

(23) $$\sum_{j=-n/2}^{n/2}G_j(\omega)e^{-i\omega\tau_T a_j}\left[\left(1-\frac{R_N}{\gamma-1}\right)\frac{\sin\omega\tau_c(a_m-a_j)}{\omega\tau_c(a_m-a_j)}\right.$$
$$\left.+\frac{\gamma R_N}{\gamma-1}\frac{\sin\gamma\tau_c(a_m-a_j)}{\omega\gamma\tau_c(a_m-a_j)}+R_U\delta_{mj}\right]=\frac{\sin\omega\tau_c a_m}{\omega\tau_c a_m}$$

for $m=-n/2\ldots n/2$

As a special case, when $\gamma$ is equal to $\infty$, Equation 23 becomes:

(23a) $$\sum_{j=-n/2}^{n/2}G_j(\omega)e^{-i\omega\tau_T a_j}\left[\frac{\sin\omega\tau_c(a_m-a_j)}{(\omega\tau_c(a_m-a_j)}\right.$$
$$\left.+(R_N+R_U)\delta_{mj}\right]=\frac{\sin\omega\tau_c a_m}{\omega\tau_c a_m}$$
$$m=-n/2\ldots n/2$$

VARIATION OF γ, FIGS. 9, 10a AND 10b

From Equation 22 another important aspect of the present invention can be appreciated. Referring to FIG. 3, prior velocity filtering systems did not set an upper limit on the noise reject band. All events having moveouts greater than $\tau_c$ are rejected in such prior art processors. Stated, another way, γ is always assumed to be infinite. This results in an $f$–$k$ plot in which the noise reject region extends throughout the shaded region of FIG. 3. This has certain disadvantages. Most importantly, when the reject region extends over a broad band, the rejection of unwanted events is not as sharp as would be possible if the noist reject region were confined to that range of moveouts in which there was the greatest probability of a coherent noise event occurring.

This can be demonstrated with reference to the amplitude response shown in FIG. 9. FIG. 9 shows the amplitude response of the velocity filter as a function of wave number for a constant frequency of 35 cps. Here $\alpha=1$. Assume that it is desired to reject all events having a wave number greater than $k_1$. The solid line shows the amplitude spectrum of a filter in which γ is equal to ∞, that is, there is no upper limit on the range of noise moveouts which will be rejected. It can be seen that such a filter does have improved rejection above $k_1$ and that this rejection becomes even better at successively higher values of $k$.

However, performtnce of the filter can be improved
However, performance of the filter can be improved sentative amplitude spectrum for a γ equal to 3 is shown by the dotted lines in FIG. 9. In such a filter, the rejection at wave numbers immediately above $k_1$ is quite good. It will be noted that at $k_2$ the rejection becomes poor again. However, in situations in which the greatest probability of noise events occurring is between $k_1$ and $k_2$, the filter having a γ equal to 3 provides much improved operation. In such situations, there will be very little probability of a noise event having a wave number greater than $k_2$ appearing. Therefore, it does not matter that the rejection of the filter is poor at wave numbers above $k_2$.

By providing a means for varying γ, there is given to the seismologist an important tool which he can use effectively to obtain a good rejection of noise events on seismic traces.

As an example of the effectiveness of utilizing a finite γ instead of utilizing filters with γ equal to ∞, as has been done in the prior art, consider FIGS. 10a and 10b. In FIGS. 10a and 10b, there is shown the effectiveness of filters in passing reflection events having differing moveouts. The moveout scale varies on either side of zero in 1 millisecond steps. Both traces shown in FIGS. 10a and 10b were produced by moveout filters designed to pass all event having a moveout between −2 milliseconds and +2 milliseconds. The trace shown in FIG. 10a was produced by a filter in which γ was set to a finite value, for example 2; whereas, FIG. 10b was produced by a filter having an infinite γ. It will be noted that the events 33–35 are passed by both filters substantially without attenuation. These events all fall within the pass region of −2 milliseconds to +2 milliseconds. The filter with an infinite γ has attenuated the events 36 and 37 slightly since these fall on the edge of the pass band.

It will be noted that the filter with tht finite γ has attenuated the events 36 and 37 still more. The most striking difference between the two filters is seen with reference to the events 40 and 41. These have been attenuated substantially by the filter with infinite γ, as shown in FIG. 10b. These events have been attenuated so much that there is substantially no indication of them in the trace produced by the filter with a finite γ, as shown in FIG. 10a. Further outside the passband it will be noted that the noise increased on the trace shown in FIG. 10a. This is because these times occur outside of the narrow reject region. However, in FIG. 10b, the trace is substantially flat further outside the pass band. This increase in the passage of noise through the filter at higher values of moveout is not a serious problem because we have assumed there is a low probability of noise occurring at these high moveouts.

VARIATION OF α, FIG. 15

By having control of both α and γ, it is possible to have complete flexibility in locating the coherent noise moveout band. Suppose, for instance, that the signal is confined to a band between $+\tau_c$ and $-\tau_c$ and the coherent noise is confined to bands between $+3\tau_c$ and $+4\tau_c$ and between $-3\tau_c$ and $-4\tau_c$, then the suppression of the coherent noise will be greatest if α is set equal to 3 and γ is set equal to 4.

A comparison of the effect of varying α is shown in FIG. 15 where the amplitude response of the velocity filter is shown as a function of wave number for a constant frequency of 35 c.p.s. The values of α are 1 and 3, with $\gamma=4$ in both cases. Note that the attenuation between $k_1$ and $k_2$ is greater with $\alpha=3$ than with $\alpha=1$.

A HIGH VELOCITY REJECT TYPE FILTER, FIGS. 11a, 11b, 16 AND 17

As another example of a type of filter which can be provided in accordance with the principles of this invention, consider an optimum filter which will suppress high velocity events. That is, the filter that has previously been described is a filter which will pass high velocity events. There will now be described a filter which will reject high velocity events. In order to do this, the probability densities for signal and noise are assumed to be of the type shown in FIGS. 11a and 11b. These probability density functions may be described mathematically as follows:

$$\tilde{p}(\tilde{\tau})=\frac{1}{2\tau_c}u(\tilde{\tau}+\tau_c-\tau_T)u(\tau_c+\tau_T-\tilde{\tau})$$

$$p(\tau)=\frac{1}{2\tau_c(\gamma-\alpha)}[u(|\tau-\tau_T|-\alpha\tau_c)u(\gamma\tau_c-|\tau_T-\tau|)]$$

With these assumed probability density functions, the ensemble averages which are to be substituted into Equation 12 are as follows:

$$\langle e^{-i\omega(\tau_j-\tau_m)}\rangle=\langle e^{-i\omega(a_j-a_m)\tau}\rangle=\frac{1}{\omega\tau_c(\gamma-\alpha)(a_m-a_j)}$$
$$(\sin\gamma\omega\tau_c(a_m-a_j)-\sin\alpha\omega\tau_c(a_m-a_j))$$

$$\langle e^{-i\omega(\tilde{\tau}_j-\tilde{\tau}_m)}\rangle=\langle e^{-i\omega(a_j-a_m)\tilde{\tau}}\rangle$$
$$=\frac{1}{\omega\tau_c(a_m-a_j)}\sin\omega\tau_c(a_m-a_j)$$

$$\langle e^{i\omega\tau_m}\rangle=\langle e^{i\omega a_m\tau}\rangle$$
$$=\frac{1}{\omega\tau_c(\gamma-\alpha)a_m}(\sin\gamma\omega\tau_c a_m-\sin\alpha\omega\tau_c a_m)$$

FIG. 16 shows the time domain response of the reject processor with $\tau_T=0$, $\tau_c=2$ ms./trace, $\alpha=1$, and $\gamma=3$. Events with moveouts −1, 0, +1 are greatly attenuated. Events with moveouts −2, +2 are at edge of reject band and are suppressed by approximately a factor of 2. Events with movements −6, −5, −4, −3, +3, +4, +5, +6 are in the signal region and are passed with insignificant distortion.

FIG. 17 shows the amplitude response of the high velocity reject filters along a constant frequency line ($f=35$ c.p.s.) in $f$–$k$ space. Wave numbers less than $k_1$ are rejected and those lying between $k_1$ and $k_2$ are accepted.

NARROW ACCEPTANCE REGION TOGETHER WITH GOOD LOW FREQUENCY RESPONSE PROVIDED BY OPTIMUM FILTERS, FIGS. 12 AND 13

As previously stated, one of the big advantages of optimum pass filters over suboptimum pass filters is that if a narrow acceptance region is desisred, there is still provided a good low frequency response all the way down to DC. That suboptimum filters do not provide this good low frequency response together with a narrow acceptance region is demonstrated with reference to FIG. 12. This is an $f$–$k$ plot for a "doublet" filter with a center trace estimate. Refer to the lower left-hand portion of the figure. Note that the down 6 db line falls at approximately .025. The ordinate scale of FIG. 12 is in dimensionless frequency, that is, $\nu = f\tau_c$. Therefore, if we are considering a $\tau_c$ of .002 millisecond, then the frequency corresponding to $\nu$ of .025 is:

$$f_0 = \frac{\nu}{\tau_c} = \frac{.025}{.002} = 12.5 \text{ c.p.s.}$$

Now consider that we wish to narrow the acceptance region so that $\tau_c$ is equal to .001 millisecond. Then, the down 6 db frequency is:

$$f_0 = \frac{\nu_0}{\tau_c} = \frac{.025}{.001} = 25 \text{ c.p.s.}$$

Thus, it is seen that when the acceptance band is narrowed by having smaller $\tau_c$, the low frequency response of the filter system is adversely affected because the down 6 db point goes from 12.5 c.p.s. to 25 c.p.s. This adverse relation between $\tau_c$ and low frequency response is not present with optimum type filter systems. Refer to FIG. 13 where there is shown the $f$–$k$ plot for an optimum pass filtering system in which $\gamma$ is set equal to $\infty$, and $\alpha = 1$. FIG. 13 shows that the low frequency response is preserved in the pass band even when we have a narrow pass band. The low frequency response is independent of frequency as evidenced by absence of contour lines going to the left-hand margin.

THE EFFECT OF VARYING $R_N$ AS A FUNCTION OF FREQUENCY, FIG. 14

If information is available from the data about the frequency dependent character of $R_N$, it is possible to incorporate this into design procedure to obtain filters that are optimum for combating the actual noise occuring on the seismograms while preserving the signal. The processor will then have greatest suppression of the coherent noise in that portion of the coherent noise region of $f$–$k$ space where $R_N(\omega)$ is largest. This is accomplished with minimum adverse effect on the signal at the same frequencies. Consider, for example, two cases: Case A is for $R_N = .25$ at all frequencies, and Case B is for $R_N = 1.0$ in the range of frequencies from 25–45 c.p.s. and $R_N = .25$ elsewhere. The amplitude response is the same for the two cases in the frequency range outside 25–45 c.p.s. Within the range 25–45 c.p.s. where $R_N$ is larger, the processor shows increased suppression in the coherent noise region to the right of the $\tau_c$ line with almost no suppression in the signal region to the left of the $\tau_c$ line. This preferential suppression of coherent noise in comparison to signal at a constant frequency of 35 c.p.s. is shown in FIG. 14.

A DIGITAL ROUTINE FOR PRACTICING THE INVENTION

The basic principles which are necessary for a person of ordinary skill in the seismic data processing art to practice this invention have now been described. There will next be described one suitable digital program for determining the time domain coefficients of the filters 11, 12, 13 and 14 of FIG. 2. Once the coefficients of each of these filters have been determined in accordance with this invention, these coefficients can be used to set up time domain filters. One example of such a time domain filter is contained in U.S. Pat. 3,076,177 to P. L. Lawrence et al. In FIG. 9 of that patent, there is shown an analog time domain filter in which the filter coefficients determine the amplitude and polarity of the signals taken from amplifiers 74a–74n. It is these filter coefficients which are determined from the following digital computer routine.

Of course, it will be appreciated that these coefficients may be used in another digital routine which performs the time domain filtering in a digital manner. Such programs for digital time domain filtering are well known. See for example, Principles of Digital Filtering, E. A. Robinson and S. Treitel, Geophysics, vol. 29, No. 3, June 1964, pp. 395–404.

There will now be described the digital computer routine for solving the equations which define the filters in accordance with this invention. This routine is written in Fortran language which is suitable for use on most digital computing systems. One system for which the program is particularly suitable is the Control Data Corporation Computer 1604. The following routine is for the derivation of the high velocity pass type of filters which are described by Equation 22. Another routine is available for the high velocity reject type of filters.

```
      SUBROUTINE VFILTI (B, PHN, PHU, NB, RN,
         RU, GAMA, ALPHA)
      HI VELOCITY PASS FILTER
   8  DIMENSION PHN (1), PHU (1), B (12,200)
      DIMENSIION A (50, 50), G (25, 25), C (12,200)
      NB2=NB/2
   9  PRINT 10
  10  FORMAT   (37H  OPTIMUM  MO  DISCRIM
         FILTERS A5011204)
      M=50
      CDELN=.505
      TAUC=.002
  16  RAT=RN
  17  PI=3.1415926536
  18  DELN=PI/(CDELN*FLOATF (M))
  21  AZ=.5*FLOATF (NB+1)
  26  M=M+1
  41  ANU=0.0
  42  KL=1
  50  AL=1.0
      RNN=RN*PHN(KL)
      RUU=RU*PHU(KL)
  51  DO 160 L=1, NB
  52  BANU=ANU*(AL-AZ)
  54  IF (BANU) 55, 57, 55
  55  A(L, NB+1)=SINF (BANU)/BANU
  56  GO TO 60
  57  A(L, NB+1)=1.0
  60  AJ=1.0
  65  DO 155 J=1, L
  75  IF(J-L)80, 100, 80
  80  DEL=0.0
  81  IF (ANU) 85, 105, 85
  85  SFUN1=SINF (ANU*(AL-AJ))/
         (ANU*(AL-AJ))
      SFUN3=SINF (ANU*ALPHA*(AL-AJ)/
         (ANU*ALPHA*(AL-AJ))
  90  SFUN2=SINF (ANU*GAMA*(AL-AJ)/
         (ANU*GAMA*(AL-AJ))
  95  GO TO 115
 100  DEL=1.0
 105  SFUN1=1.0
      SFUN3=1.0
 110  SFUN2=1.0
 115  IF (GAMA−10000.0) 120, 130, 130
 120  RR=RUU
 125  GO TO 140
 130  RR=RUU+RNN
 135  RNN=0.
 140  A (L, J)=2.* (SFUN1−ALPHA*RNN/
         (GAMA−ALPHA)*SFUN3*GAMA*RNN/
         (GAMA−ALPHA) (*SFUN2+RR*DEL)
1401  A(J, L=A(L,J)
 141  RNN=RAT*PHN(KL)
 155  AJ=AJ+1
 160  AL=AL+1.0
 185  CALL MATS (A, G, NB, 1)
 190  DO 192 I=1, NB2
 192  C(I, KL)=G(I, 1)
 293  ANU=ANU+DELN
```

```
295 KL=KL+1
300 IF(KL—M) 50, 50, 430
430 DELF=DELN/(TAUC*2. *PI)
435 DO 457 I=1, NB2
440 DO 445 J=1, M
445 PHU(J)=C(I, J)
450 CALL FOCOSYN (M—1, DELF, PHU, PHN)
455 DO 457 L=1, M
    B(NB+1—I, L)=PHN(L)
457 B(I, L)=PHN(L)
    RETURN
    END

SUBROUTINE MATS (A, X, N, M)
    DIMENSION A(50, 50), X(25, 25)
    MM=N+M
    DO 15 I=2, N
 70 II=I—1
  7 DO 15 J=1, II
  8 IF (A(I, J))9, 15, 9
  9 IF (ABSF(A(J, J))—ABSF(A(I, J)))11, 10, 10
 10 R=A(I, J)/A(J, J)
    GO TO 130
 11 R=A(J, J)/A(I, J)
    DO 12 K=1, MM
    B=A(J, K)
    A(J, K)=A(I, K)
 12 A(I, K)=B
130 JJ=J+1
 13 DO 14 K=JJ, MM
 14 A(I, K)=A(I, K)—R*(J, K)
 15 CONTINUE
    IF (ABSF(A(N, N))—1.0E—10)16, 16, 17
 16 PAUSE 77777
 17 DO28J=1, M
    KK=N+J
    X(N, J)=A(N, KK)/A(N, N)
    DO28I=2, N
    JJ=N—I+1
    B=0.
    II=N—I+2
    DO 25 K=II, N
 25 B=B+A(JJ, K)*X(K, J)
    IF (ABSF(A(JJ, JJ))—1.0E—10)16, 16, 28
 28 X(JJ, J)=(A(JJ, KK)—B)/A(JJ, JJ)
    RETURN
    END (2, 2, 2, 2, 2)
```

First, the parameters are specified. The coherent noise signal power $R_N(f)$ is, for the purposes of this program, composed of two components, RN and PHN. The product of these latter two functions is equal to the coherent noise power. This is specified by two components for this reason. RN sets the level and PHN can be made to vary with frequency. In cases in which it is not desired to have the coherent noise power varied with frequency, PHN is set equal to 1 and the coherent noise power is determined solely by RN. Similarly, the random noise power $R_U(f)$ is the product of the two constants, RU setting the level, and PHU which can vary with frequency.

NB is the number of filters, previously referred to as $n$, and GAMA and ALPHA are the parameters $\gamma$ and $\alpha$ which have been previously described.

Instruction 8 is a dimension instruction which specifies how big an array of storage must be set aside for the data.

The Instruction 8 also calculates half the number of traces, that is, NB2 is set equal to NB/2.

Instruction 10 specifies further parameters in a particular format. The number of samples in each filter is equal to 2M+1. In this case, M is set equal to 50. Therefore, the number of samples in each filter is 101.

CDELN is a parameter that determines the sampling interval in $\nu$ which is dimensionless frequency. CDELN is equal to .505 in the program described.

TAUC specifies the selected value of $\tau_c$ and in this case is set equal to .002.

Instruction 16 set RAT equal to the selected coherent noise power so that it will always be available for use.

Instruction 17 gives the value of $\pi$.

Instruction 18 calculates the sampling interval in dimensionless frequency. Instruction 18 sets the sampling interval $\Delta\nu$ which is given the designation DELN. The sampling interval is:

$$\Delta\nu = \frac{\pi}{.505 * 50.}$$

Instruction 21 sets the estimation point AZ at NB+1/2. Instruction 26 increments M by 1.

In Instruction 41, ANU is a constant equal to 0, which will be incremented by the sampling interval DELN.

Instruction 42 sets the integer KL equal to 1. KL is the frequency domain sample index. This index is incremented by 1 as the program progresses.

Instruction 50 sets the integer AL equal to 1. AL is an index which is related to $m$, as shown in Table I. Following Instruction 50, the power spectra ratios are computed for the KLth sample.

Instruction 51 initiates a do loop which includes all of the instructions through Instruction 160. This do loop generates an equation for each value of $m$. That is, this do loop expands Equation 12 for each value of $m$ to generate successive equations, such as the Equations 13, 14, 15 and 15a.

Instruction 52 makes an adjustment necessitated because in Equation 12 it was assumed that the traces, or filters, were numbered from $-6$ to $+6$. That is, $m$ goes from $-6$ to $+6$. However, in the program we have assumed that the traces are numbered from 1 to 12. In order to get the proper $a_m$ specified by Equation 12, we must compute $a_m$ as equal to $m-$AZ. In the table below, there is shown the trace numberings as specified by Equation 12 and as specified by the subroutine.

TABLE I

| $m$ | $a_m$ | AL | $a_m =$ AL-AZ |
|---|---|---|---|
| −6 | −5.5 | 1 | −5.5 |
| −5 | −4.5 | 2 | −4.5 |
| −4 | −3.5 | 3 | −3.5 |
| −3 | −2.5 | 4 | −2.5 |
| −2 | −1.5 | 5 | −1.5 |
| −1 | −.5 | 6 | −.5 |
| +1 | +.5 | 7 | +.5 |
| +2 | +1.5 | 8 | −1.5 |
| +3 | +2.5 | 9 | +2.5 |
| +4 | +3.5 | 10 | +3.5 |
| +5 | +4.5 | 11 | +4.5 |
| +6 | +5.5 | 12 | +5.5 |
| (Equation 12) | | (Subroutine) | |

Note that AZ has already been calculated as being NB+1/2. If we assume that there are 12 traces, then AZ is equal to 6.5. Therefore, $a_m$ is the proper value for each value of $m$ even though a different trace numbering has been employed.

Instruction 54 specifies that if BANU is 0, jump to Instruction 57; otherwise, proceed with Instruction 55.

As previously mentioned, the Instructions 51 to 160 are a do loop which generates a set of simultaneous equations. These equations are specified by a matrix which is of the form:

| $a_{mj}$ | $a_{m,n+1}$ |
|---|---|
| [A] $\begin{bmatrix} a_{11} & a_{12} & \cdots & a_{1n} \\ a_{21} & a_{22} & \cdots & a_{2n} \\ \vdots & & & \vdots \\ a_{n1} & a_{n2} & \cdots & a_{nn} \end{bmatrix}$ | $\begin{bmatrix} a_{1(n+1)} \\ \\ \\ \\ \end{bmatrix}$ |

Instruction 55 is developing the extreme right-hand column of the matrix. SINF (BANU) is the sine function on the right-hand side of Equation 22; that is, $\sin \omega\tau_c a_m$. BANU is $\omega\tau_c a_m$. Note that when BANU is equal to 0, which is the case for the first frequency sample; that is, ANU=0, then the calculation required to be performed by Instruction 55 is indeterminate. That is $$\frac{\sin \omega\tau_c a_m}{\omega\tau_c a_m} = \frac{0}{0}$$

which is indeterminate. In this case, Instruction 54 has instructed the computer to skip Instruction 55 and, instead, go to Instruction 57 wherein the coefficient $a_{m,n+1}$ is set equal to 1.0. The right-hand side of Equation 22 is set equal to 1 for the frequency sample 0 to avoid an indeterminate function.

Instruction 56 instructs the computer to skip to Instruction 60. This occurs if Instruction 55 has been performed.

Instruction 57 is performed only in the event that BANU was equal to 0, as specified by Instruction 54. If BANU is equal to 0, then the coefficient in the right-hand column of the matrix is set equal to 1.

Instruction 60 specifies that AJ is first set equal to 1.0.

Instructions 65 through 155 constitute a do loop which performs the summation from $j=1$ to $n$ in Equation 22. That is, J, corresponding with $j$ in Equation 22, takes on successive integer values between 1.0 and the total number of traces.

The do loop, including Instructions 65 to 155, is repeated with J being repetitively incremented until J is equal to L.

Instruction 75 specifies that if J–L is 0, skip to Instruction 100; otherwise, go to Instruction 80.

Instruction 80 specifies that DEL, which corresponds to $\delta_{mj}$ in Equation 22, is equal to 0 if J is not equal to L. If J is equal to L, then DEL is equal to 1 as specified by Instruction 100.

Instruction 81 specifies that if ANU is 0, that is, if this is the first frequency sample, go to Instruction 105 which, along with the following instruction, sets SFUN1 and SFUN3 equal to 1.0. SFUN1 and SFUN3 are the functions $$\frac{\sin \omega\tau_c(a_j-a_m)}{\omega\tau_c(a_j-a_m)}$$

and $$\frac{\sin \alpha\omega\tau_c(a_j-a_m)}{\alpha\omega\tau_c(a_j-a_m)}$$

Note that these two functions are indeterminate if $\omega$ is equal to 0, that is, for the first frequency sample. Therefore, in this case, Instruction 105 and the next instruction set these two functions equal to 1.0. Otherwise, Instruction 81 instructs the computer to jump to Instruction 85 which, along with the following instruction, computes the functions SFUN1 and SFUN3.

Instruction 90 computes the function $$\frac{\sin \omega\gamma\tau_c(a_j-a_m)}{\omega\gamma\tau_c(a_j-a_m)}$$

which is denoted SFUN2.

Instruction 95 causes a skip to Instruction 115.

Instruction 115 specifies that if $\gamma$ is selected to be very large, that is, 10,000 or more, then go to Instruction 130; if $\gamma$ is smaller than this, that is, finite, then go to Instruction 120. If $\gamma$ is very large, then the random and coherent noise factors, RUU and RNN, are lumped together into one constant, RR. Then, Instruction 135 sets RNN equal to 0.

Instruction 140 calculates the left-hand side of Equation 22 when $\gamma$ is very large. In this way, there is calculated the coefficient $a_{mj}$ for insertion into the matrix.

The matrix which is generated for solution is a symmetrical one about a diagonal line passing from corner to corner of the matrix; that is, $a_{21}$ is equal to $a_{12}$. Therefore, Instruction 1401 sets $a_{12}$ to equal $a_{21}$. In this manner, only half the number of coefficients need be generated.

Instruction 141 sets RNN equal to RAT multiplied by PHN for the next frequency sample.

Instruction 155 increments AJ by 1 so that the functions of Equation 22 are computed for the next value of J.

Instruction 160 increments AL by 1. This is the last instruction in the larger do loop for calculating an array of equations for each value of $m$.

Instruction 185 calls up a subroutine which solves a matrix of simultaneous equations. This subroutine is a standard routine for solving such a matrix of simultaneous equations. For convenience of those desiring to use it, the subroutine is set forth at the end of the routine being described.

Instructions 190 and 192 are a do loop which stores the frequency samples in the C array; that is, there has just been computed the spectrum of each of the L filters at a particular frequency. These samples are stored in the C array.

Instruction 293 increments ANU by the sampling interval DELN. Then, the steps that have been performed for one frequency sample are repeated for successive frequency samples.

Instruction 293 increments ANU by the frequency sampling interval so that the spectrum for each filter can be computed for the next frequency sampling interval.

Instruction 295 increments KL by 1 so that the frequency spectrum for each filter can be computed at the next frequency sampling point.

The filters are computed for each 50 sampling points; that is, for each value of M. Therefore, Instruction 300 states that if KL=M, proceed to Instruction 430 for the completion of the program; otherwise, go back to Instruction 50 to compute the spectra at another frequency sampling interval.

The only task remaining is the conversion of the frequency spectrum of the filters to the time domain so that the generated time domain operators can be applied to time domain filters which are used to actually filter the seismic data. Preparatory to doing this, Instruction 430 calculates DELF as the true frequency sampling interval which is equal to DELN, the frequency sampling interval in dimensionless frequency, divided by $2\pi\tau_c$.

Instructions 435 through 457 constitute a do loop which brings the spectrum of the first filter out of storage so that it can be converted to the time domain.

Instruction 435 initiates a do loop which continues through Instruction 457. This do loop calls up a subroutine which performs a Fourier analysis on each of the amplitude spectrums which has been generated to convert it to a time domain representation.

Instructions 440 and 445 are a do loop which sets the spectrum of the Mth filter into the PHU array.

Instruction 450 calls up a subroutine which performs a Fourier synthesis on the frequency spectrum to convert it to a time domain operator. This time domain operator is put into the PHN array; then, the time domain operator is put into the B array. There is symmetry of filters about the estimation point. Therefore, assuming there are 12 filters, filter 1 is equal to filter 12, filter 2 is equal to filter 11, and so on.

Instruction 457 sets filters which have not been calculated equal to their symmetrical counterpart. This is the end of the subroutine.

While particular embodiments of the invention have been shown and described, it will, of course, be understood that various modifications can be made without departing from the principles of the invention. The appended claims are, therefore, intended to cover any such modifications within the true spirit and scope of the invention.

What is claimed is:

1. Apparatus for processing $n$ seismic data traces each representing primary reflections of a seismic disturbance from reflecting interfaces in subsurface formations and coherent noise including multiple reflections of said seismic disturbance from said reflecting interfaces, comprising:

n filters each having an amplitude spectrum $G_j(\omega)$ determined by the following:

$$\sum_{j=-n/2}^{n/2} G_j(\omega) \left[ \int_{-\infty}^{+\infty} e^{-i\omega(a_j\tau - a_m\tau)} p(\tau) d\tau \right.$$

$$+ R_N(\omega) \int_{-\infty}^{+\infty} e^{-i\omega(a_j\tilde{\tau} - a_m\tilde{\tau})} \tilde{p}(\tilde{\tau}) d\tilde{\tau}$$

$$\left. + \delta_{mj} R_U(\omega) \right] = \int_{-\infty}^{+\infty} e^{i\omega a_m \tau} p(\tau) d\tau$$

$$m = -n/2, \ldots, n/2$$

where $i$ represents $\sqrt{-1}$ $n$ is the total number of traces, $j$ represents successive integers between $-n/2$ and $n/2$, not including zero, $m$ represents successive integers between $-n/2$ and $n/2$, not including zero, $\omega$ is the frequency of the seismic disturbance, $\tau$ represents primary reflection moveout per trace, $\tilde{\tau}$ is the coherent noise moveout per trace, $a_j$ is a number equal to the distance from the estimation point to the detector producing the $j$th trace divided by the spacing between the successive detectors, $a_m$ is a number equal to the distance from the estimation point to the detector producing the $m$th trace divided by the spacing between the successive detectors, $\delta_{mj}$ is equal to 1 when $m=j$; it is 0 at other times, $R_U(\omega)$ is the random noise-to-signal power ratio, $R_N(\omega)$ is the coherent noise-to-signal power ratio, $p(\tau)$ is the probability density function of the primary $\tilde{p}(\tau)$ is the probability density function of the coherent reflection moveout, and noise moveout, and means for applying each of said $n$ traces to a different one of said $n$ filters, and means for summing the outputs of said filters to form a composite trace which is substantially absent coherent noise including said multiple reflections.

2. The apparatus recited in claim 1 wherein the probability density function of said noise moveout is selected so that the noise moveout per trace $\tilde{\tau}$ is uniformly distributed in a noise band between the limits $\tau_T - \tau_c$ and $\tau_T + \tau_c$, where $\tau_T$ is the midpoint of the band and $2\tau_c$ is the bandwidth, so that the probability density function of the noise moveout is given by:

$$\tilde{p}(\tilde{\tau}) = \frac{1}{2\tau_c} u(\tilde{\tau} + \tau_c - \tau_T) u(\tau_c + \tau_T - \tilde{\tau})$$

where $u(\tau)$ is a unit step function, and wherein the probability density function of the signal moveout per trace $\tau$ is selected so that the signal moveout per trace $\tau$ is uniformly distributed outside the noise band and within a region defined by:

$$\alpha \tau_c < |\tau - \tau_T| < \gamma \tau_c$$

where $\alpha \tau_c$ is the lower limit to the signal moveout band, and $\gamma \tau_c$ is the upper limit so that the probability density function $p(\tau)$ of said signal moveout is given by:

$$p(\tau) = \frac{1}{2\tau_c(\gamma - \alpha)} u(|\tau - \tau_T| - \alpha \tau_c)$$

$$u(\gamma \tau_c - |\tau_T - \tau|)$$

where $u(\tau)$ is a unit step function.

3. The apparatus recited in claim 2 wherein $\alpha$ and $\gamma$ are varied thereby changing the lower and upper limits of said signal moveout band to provide the optimum suppression of coherent noise in the band in which said noise is most likely to occur.

4. The apparatus recited in claim 2 wherein each of said filters are modified in accordance with the dependence of $R_N(\omega)$ and $R_U(\omega)$ on frequency to concentrate the greatest supression in that portion of the $f$–$k$ space in which $R_N(\omega)$ and $R_U(\omega)$ are high and accentuate that portion in which $R_N(\omega)$ and $R_U(\omega)$ are low.

References Cited

UNITED STATES PATENTS

| | | | |
|---|---|---|---|
| 3,274,541 | 9/1966 | Embree | 340—15.5 |
| 3,284,763 | 11/1966 | Burg et al. | 340—15.5 |

RICHARD A. FARLEY, Primary Examiner

D. C. KAUFMAN, Assistant Examiner

PO-1050
(5/69)

UNITED STATES PATENT OFFICE
CERTIFICATE OF CORRECTION

Patent No. 3,550,073      Dated December 22, 1970

Inventor(s) Manus R. Foster, Raymond L. Sengbush, and Robert J. Watson

It is certified that error appears in the above-identified patent and that said Letters Patent are hereby corrected as shown below:

Column 1, line 46, "movement" should read --moveout--; and line 47, "Ser. No. 344,699" should read --Ser. No. 334,699--. Column 2, line 11, "descrpition" should read --description--. Column 3, line 6, "prqduct" should read --produce--; line 24, "S(t)" should read --$\tilde{S}(t)$--; line 35, "of" should read --or--; and line 42, "additionu" should read --addition--. Column 4, lines 1 to 3, that portion of Formula (4) reading $$e^{i2\pi f(t-kx_m)} \quad \text{should read} \quad e^{i2\pi(ft-kx_m)}$$

Column 4, lines 15 to 17, that portion of Formula (6) reading $$e^{-i2\pi kx_w} \quad \text{should read} \quad e^{-i2\pi kx_m}$$

Column 4, line 72, $\widetilde{\widetilde{\tau}}$ should read $\widetilde{\tau}$. Column 5, lines 43 and 46 $\widetilde{\widetilde{\tau}}$ should read $\widetilde{\tau}$. Column 5, lines 65 and 66, cancel "where: m=-n/2,...n/2". Column 6, line 15, $$p(\widetilde{\tau}) \quad \text{should read} \quad \widetilde{p}(\widetilde{\tau})$$

Column 6, lines 56 through 62, the portions of Formula (13) which read "$\tau$-2" should read --$\tau_{-2}$--. Column 6, lines 68 through 74, the portions of Formula (14) reading "$\tau$-1" should read --$\tau_{-1}$--. Column 7, line 3, that portion of Formula (15) reading $$e^{-i\omega(\tau-2-\tau_1)} \quad \text{should read} \quad e^{-i\omega(\tau_{-2}-\tau_1)}$$

and that portion reading $$e^{-i\omega(\tau_{-2}\sim\tau_1)} \quad \text{should read} \quad e^{-i\omega(\widetilde{\tau}_{-2}-\tau_1)}$$

Column 7, line 5, that portion of Formula (15) reading $$e^{-i\omega(\tau-1)} \quad \text{should read} \quad e^{-i\omega(\tau_{-1}-\tau_1)}$$

(Continued on page 2)

PO-1050
(5/69)

UNITED STATES PATENT OFFICE
CERTIFICATE OF CORRECTION

Patent No. 3,550,073        Dated December 22, 1970

Inventor(s) Manus R. Foster, Raymond L. Sengbush, and Robert J. Watson

It is certified that error appears in the above-identified patent and that said Letters Patent are hereby corrected as shown below:

Column 7, line 6, that portion of Formula (15) (line 3 of th formula) reading $$+G_1[\,<e^{-i\omega(\tau_{-1}-\tau_1)}>R_N(\omega)<e^{-i\omega(\tilde{\tau}_{-1}-\tilde{\tau}_1)}>+R_U(\omega)\,]$$

should read $$+G_1[\,<e^{-i\omega(\tau_1-\tau_1)}>+R_N(\omega)<e^{-i\omega(\tilde{\tau}_1-\tilde{\tau}_1)}>+R_U(\omega)\,]$$

Column 7, line 9, that portion of Formula (15) (line 4 of th formula) reading $$e^{-i\omega(\tilde{\tau}_2-\tilde{\tau}_1)} \quad \text{should read} \quad e^{-i\omega(\tilde{\tau}_2-\tilde{\tau}_1)}$$

In the second line of Formula (15a) (Column 7, line 16) that portion reading $$e^{-i\omega(\tau_{-1}-\tau_2)} \quad \text{should read} \quad e^{-i\omega(\tau_{-1}-\tau_2)}$$

In the fourth line of Formula (15a) (Column 7, line 19) that portion reading $$e^{-i\omega(\tilde{\tau}_2-\tau_2)} \quad \text{should read} \quad e^{-i\omega(\tilde{\tau}_2-\tilde{\tau}_2)}$$

Column 7, line 23, "unknown" should read --unknowns--; line "movement" should read --moveout--. Formula (16) (Column 7, line 74) that portion reading $$(\tau+\tau_c-\tau_T) \quad \text{should read} \quad u(\tau+\tau_c-\tau_T)$$

In Formula (18) (Column 8, line 17) that portion reading $$u(\gamma\tau-|\tau_T-\tilde{\tau}|) \quad \text{should read} \quad u(\gamma\tau_c-|\tau_T-\tilde{\tau}|)\,]$$

(Continued on page 3)

UNITED STATES PATENT OFFICE
CERTIFICATE OF CORRECTION

Patent No. 3,550,073           Dated December 22, 1970

Inventor(s) Manus R. Foster, Raymond L. Sengbush, and Robert J. Watson

It is certified that error appears in the above-identified patent and that said Letters Patent are hereby corrected as shown below:

In Formula (19) (Column 8, line 30) that portion reading $$< e^{-i\omega(\tau j - \tau m)}$$  should read  $$< e^{-i\omega(\tau_j - \tau_m)}$$

In the second line of Formula (20) (Column 8, line 35) that portion reading $$(a_c - a_m)$$  should read  $$(a_j - a_m)$$

In the second line of Formula (23) (Column 8, line 64) that portion reading $$\frac{\sin \gamma \tau_c (a_m - a_j)}{\omega \gamma \tau_c (a_m - a_j)}$$  should read  $$\frac{\sin \omega \gamma \tau_c (a_m - a_j)}{\omega \gamma \tau_c (a_m - a_j)}$$

Column 9, line 14, "noist" should read --noise--; cancel line and between lines 30 and 31 insert --by choosing a finite $\gamma$, example, a $\gamma$ of 3. A repre- --. Column 9, line 54, "event" should read --events--; and line 64, "tht" should read --the-- Column 10, line 61, "movements" should read --moveouts--; and line 75, "desisred" should read --desired--. Column 11, line after "into" insert --the--; line 40, "occuring" should read --occurring--. Column 12, line 16, "VFILTI" should read --VFILT1--. Column 14, line 32, "-6 to $\mp$6" should read -- -6 to +6 --. Column 16, line 15, before "samples" insert --frequency--; line 51, "an d" should read --and--. Column 17 line 8 (second line of the formula) that portion of the formula reading $$p(\tilde{\tau})d\tilde{\tau}$$  should read  $$\tilde{p}(\tilde{\tau})d\tilde{\tau}$$

Column 17, line 34, after "primary" insert --reflection moveout and--; line 37, cancel "reflection moveout, and". Column 18, line 9, "u($\tau$)" should read --u($\tilde{\tau}$)--; line 35, "supression" should read --suppression--.

Signed and sealed this 20th day of April (SEAL)
Attest:

EDWARD M. FLETCHER, JR.           WILLIAM E. SCHUYLER, JR.
Attesting Officer                 Commissioner of Patents